United States Patent
Paz et al.

(10) Patent No.: US 12,347,155 B2
(45) Date of Patent: Jul. 1, 2025

(54) IMAGE ADJUSTMENT

(71) Applicant: Hewlett-Packard Development Company, L.P., Spring, TX (US)

(72) Inventors: Gabriel Lima Paz, Porto Alegre (BR); Rafael Dal Zotto, Porto Alegre (BR); Qian Lin, Palo Alto, CA (US); Malcolm Stuart Rix, Chula Vista, CA (US); Dun Liu, Chongqing (CN); Gabriel Lando, Porto Alegre (BR); Joao Luis Prauchner, Porto Alegre (BR); Andre Gobbi Farina, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 399 days.

(21) Appl. No.: 17/890,641

(22) Filed: Aug. 18, 2022

(65) Prior Publication Data
US 2024/0062502 A1 Feb. 22, 2024

(51) Int. Cl.
*G06V 40/16* (2022.01)
*G06T 11/00* (2006.01)
*G06V 10/24* (2022.01)
*G06V 10/25* (2022.01)
(Continued)

(52) U.S. Cl.
CPC .............. *G06V 10/24* (2022.01); *G06V 10/25* (2022.01); *G06V 10/771* (2022.01); *G06V 40/161* (2022.01); *G06V 2201/07* (2022.01)

(58) Field of Classification Search
CPC ...... G06V 10/24; G06V 10/25; G06V 10/771; G06V 40/161; G06V 2201/07; G06T 11/00
See application file for complete search history.

(56) References Cited

U.S. PATENT DOCUMENTS

| 9,542,751 | B2 * | 1/2017 | Mannino ................. G06T 7/73 |
| 10,033,921 | B2 * | 7/2018 | Song ....................... H04N 23/61 |
| 2019/0377409 | A1 * | 12/2019 | Lemley ................... G06F 3/013 |

(Continued)

FOREIGN PATENT DOCUMENTS

WO WO-2023040288 A1 * 3/2023 ......... H04N 21/4126

OTHER PUBLICATIONS

Singh, Navjot, Rinki Arya, and R. K. Agrawal. "A novel position prior using fusion of rule of thirds and image center for salient object detection." Multimedia Tools and Applications 76 (2017): 10521-10538. (Year: 2017).*

(Continued)

*Primary Examiner* — Stephen R Koziol
*Assistant Examiner* — Joshua Chen
(74) *Attorney, Agent, or Firm* — Quarles & Brady LLP

(57) ABSTRACT

A device includes a display panel and a processor. The processor is to receive information corresponding to an image displayed on the display panel and determine whether a relevant portion of the image is centered with respect to an area of interest of the display panel. The processor is further to responsive to a determination that the relevant portion of the image is not centered with respect to the area of interest of the display panel, perform an operation to cause the relevant portion of the image to be adjusted such that the relevant portion of the image is centered with respect to the area of interest of the display panel.

20 Claims, 4 Drawing Sheets

(51) Int. Cl.
*G06V 10/771* (2022.01)
*G06V 40/20* (2022.01)

(56) References Cited

U.S. PATENT DOCUMENTS

| | | | |
|---|---|---|---|
| 2023/0033533 A1* | 2/2023 | Kaniyala | G06T 7/251 |
| 2023/0360430 A1* | 11/2023 | Qian | G06V 10/776 |
| 2024/0056683 A1* | 2/2024 | Lin | H04N 23/673 |

OTHER PUBLICATIONS

Singh, Navjot, Rinki Arya, and R. K. Agrawal. "A novel position prior using fusion of rule of thirds and image center for salient object detection." Multimedia Tools and Applications 76 (2017): 10521-10538. (Year: 2017) (Year: 2017).*

* cited by examiner

IMAGE ADJUSTMENT

BACKGROUND

An electronic device can include a computing device that can perform computing functions. In some examples, the computing device can include a display panel and can be coupled to an imaging device, such as a camera. The camera can be utilized to capture images of objects and the display panel can be utilized to store display the images captured by the imaging device.

DETAILED DESCRIPTION

Figure 1:
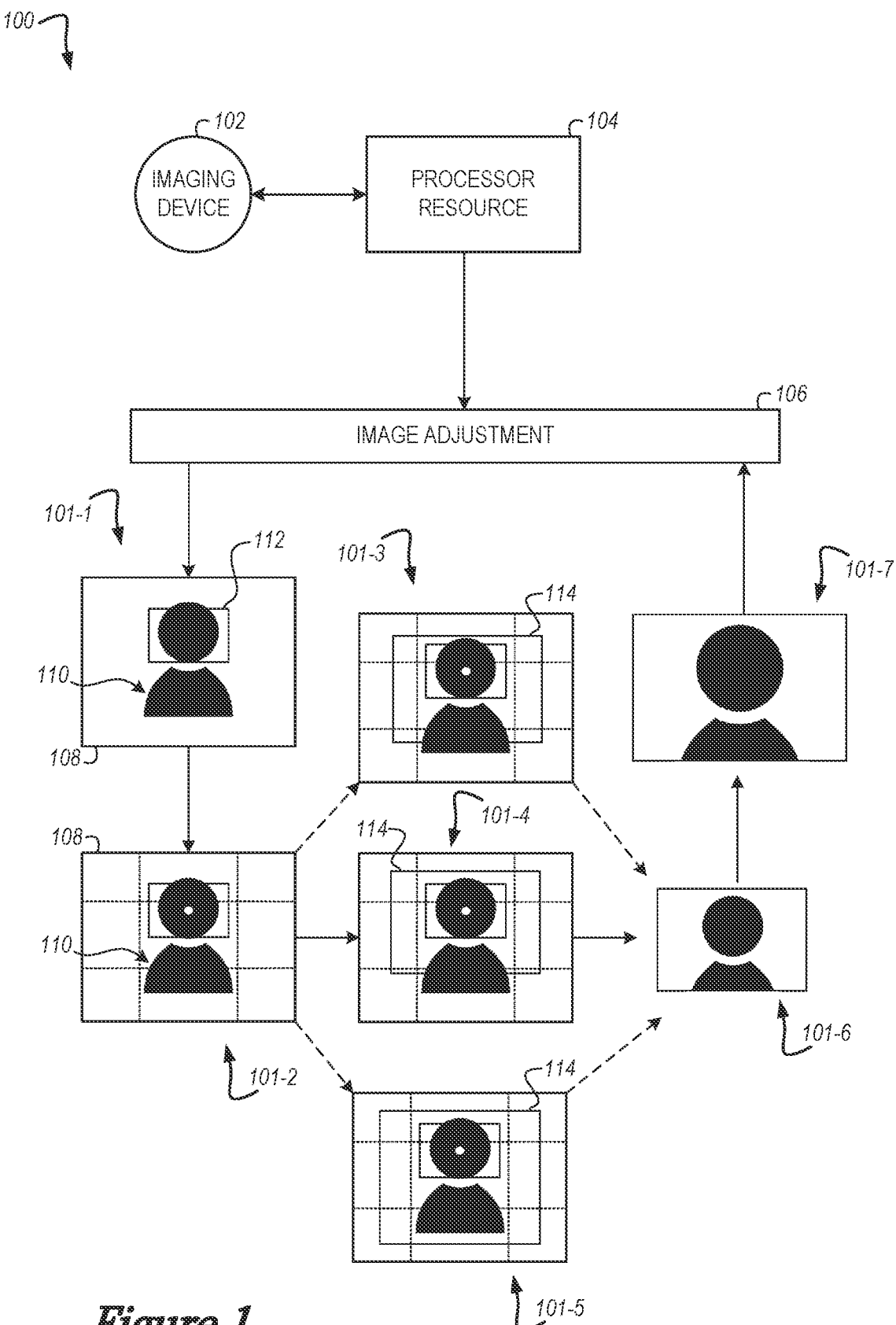
FIG. 1 illustrates an example of a flow for providing image adjustment.

A user may utilize a computing device for various purposes, such as for business and/or recreational use. As used herein, the term computing device refers to an electronic system having a processor resource and a memory resource. Examples of computing devices can include, for instance, a laptop computer, a notebook computer, a desktop computer, controller, and/or a mobile device (e.g., a smart phone, tablet, personal digital assistant, etc.), among other types of computing devices.

Computing devices can be utilized as teleconference devices. As used herein, a teleconference device can be utilized to provide audio and/or video data to remote computing devices. In this way, a teleconference device can be a computing device that can communicate with remote computing devices and allow remote users to communicate through audio and/or video data transferred between computing devices.

In some instances, a plurality of computing devices can be utilized for a teleconference by connecting to a teleconference application. The teleconference application can include instructions that can be utilized to receive audio and/or video data from the plurality of computing devices and provide the audio and/or video data to each of the plurality of computing devices. In some examples, the teleconference application can be a teleconference portal that can be utilized by a plurality of computing devices to exchange audio and/or video data. As used herein, a teleconference portal can refer to a gateway for a website that can provide teleconferencing functions.

In some examples, the images captured by an imaging device associated with a teleconference device can include human users. Similarly, audio captured by a recording device can be include audio emitted by the human users. However, during the course of a teleconference event, the human users can move (e.g., while communicating and/or gesticulating during the teleconference event) such that the human users are outside an area of interest (e.g., a center area) captured by an imaging device and/or displayed by a display panel of the computing device.

As virtual meetings, remote learning, and/or video sharing, among other uses for teleconference events and/or applications that involve capture and display of images of human users become increasingly prevalent, it can become important to ensure that such human users are displayed within an area of interest captured by an imaging device and/or displayed by a display panel of the computing device, as opposed to being displayed outside the area of interest.

By seeking to ensure that the human user(s) are displayed within an area of interest captured by an imaging device and/or displayed by a display panel of the computing device, communication can be improved and/or misunderstandings can be reduced, thereby increasing the trust and confidence that can arise from visual connections (e.g., visual connections such as those facilitated by teleconferencing events and/or other applications that involve the capture and display of human images). At the same time, some human users may not reveal their background, instead choosing to display instead just their face (e.g., their visage).

As such, the present disclosure relates to providing image adjustment and, more specifically to providing image adjustment during a teleconference or during execution of applications that involve capture and display of images of human users either in real-time or for later reproduction. For instance, information corresponding to an image displayed on a display panel (e.g., a display panel of a computing device) can be received (e.g., by a processor of the computing device). A determination can be made as to whether a relevant portion of the image is centered with respect to an area of interest of the display panel, as described in more detail, herein, Responsive to a determination that the relevant portion of the image is not centered with respect to the area of interest of the display panel, the processor can perform an operation to cause the relevant portion of the image to be adjusted such that the relevant portion of the image is centered with respect to the area of interest of the display panel.

FIG. 1 illustrates an example of a flow 100 for providing image adjustment. A computing device (not explicitly illustrated in FIG. 1 so as to not obfuscate the drawings) includes an imaging device 102, a processor resource 104 (which may be referred to herein for brevity as a "processor"), and a display panel 108. The imaging device 102, the processor resource 104, and/or the display panel 108 can transfer signals, commands, instructions, or other information between one another to provide image adjustment 106 as described herein.

Image adjustment 106 can include interception (e.g., by the processor resource 104) of images captured by the imaging device 102 and process the images prior to the images being reproduced on the display panel 108. For example, the processor resource 104 can apply a sequence of transformations on top of the images captured by the imaging device 102 using various techniques.

One such technique is referred to as a driver device transform. A driver device transform, which is known as a "device MFT" (DMFT), can allow for image transforms to be applied to images and/or video via the use a specific camera or type of imaging device.

In contrast to utilizing DMFT techniques, aspects of the present disclosure allow for the use of a proxy camera or virtual camera to perform the operations described herein. A proxy camera and/or virtual camera can allow the output of an imaging device, such as the imaging device 102, pass through post-processing routines and generate a new camera content with the post-processed (or modified) output. There are many examples of proxy camera and/or virtual camera applications and post-processing that include, but are not limited to, resizing, cropping, limiting the maximum refresh rate, etc. In some examples, the post-processing routines utilized to generate the new camera content with the post-processed (or modified) output can be performed by the processor resource 104 and/or, in examples when the image adjustment 106 is an image adjustment component that includes hardware circuitry to perform image processing operations, the image adjustment component.

As described in more detail herein, image adjustment can be provided by decomposing input frames using technologies such as DMFT and/or proxy camera or virtual camera methodologies. With the images captured by the imaging device 102 intercepted in this way, image adjustment can allow for each individual image (or "frame") to be processed. This can allow for the creation of modified images or frames, which a user of the computing device (e.g., a presenter during a teleconference event) can select for presentation to other users (e.g., the audience) of the teleconference event.

At operation 101-1, images of a user 110 (e.g., a human user) of a computing device can be displayed on a display panel 108. Facial detection operations can be performed (e.g., by the processor resource 104) to detect the presence of the user 110 when the user 110 is using the computing device, Various non-limiting examples of face detection operations that can be performed include feature-based, appearance-based, knowledge-based, template matching facial, and/or machine learning-based detection operations, among others. In some examples, such facial detection operations can be employed to generate a bounding box 112 that includes the face of the user 110.

Although shown in FIG. 1 as a single user 110, examples are not so limited and, in some examples, multiple users or people may be captured by the imaging device 102. In such examples, the processor resource 104 may perform facial recognition operations to determine a particular user of the computing device to reproduce on the display panel 108. That is, in some examples, one user 110 may be selected among multiple detected users or people captured by the imaginal device 102, and the user 110 to be reproduced on the display panel 108 may be extracted from the other users or people such that the user 110 is captured and reproduced on the display panel 108. It is however contemplated within the scope of the disclosure that a quantity of users or people captured by the imaging device 102 that is different than one may be captured and reproduced on the display panel 108.

For example, an area of interest (described in more detail below) can be generated such that, in the case of multiple users or people being present on a frame captured by the imaging device 102, one user or multiple users are within the area of interest. That is, in some examples, a bounding box (described in more detail below) can be generated to include more than one user for reproduction on the display panel 108, or the bounding box can be generated to include a single user for reproduction even if multiple users are in the field of the imaging device 102. In some examples, whether the bounding box and/or the area of interest are generated to include a single user or multiple users can be performed responsive to receipt of an input (e.g., in response to an option to reproduce one user or multiple users that is selectable in a graphical user interface or other means of generating such a selection input).

In examples in which an option to reproduce a single user when multiple users are present in the field of the imaging device 102 is selected, the user who is closets to the imaging device 102 may be selected and the bounding box and/or area of interest may be generated to include that user. Examples are not so limited, however and the user could be selected based on facial recognition (e.g., to include a user who is recognized by the computing device), a user who appears larger in the field of the imaging device 102, etc. In examples in which an option to reproduce multiple users is selected, the bounding box and/or area of interest can be generated to include such multiple users.

At operation 101-2, an operation to determine a center point (illustrated by the white dot located on the face of the user 110) of the face of the user 110 can be performed. The center point can, in some examples, represent a center point of a result of the facial detection operation described above and/or can be a center point of the bounding box 112.

Further, at operation 101-2, a determination can be made as to whether the face of the user 110 lies within or outside of a central region of the display panel 108. As shown in FIG. 1, the central region is delimited by the third frame lines (e.g., the dashed lines shown in the display panel 108 of FIG. 1) used in the photographic concept of the "rule of thirds." As used herein, the "rule of thirds" refers to a guideline for composing images that proposes that an image should be imagined as divided into nine equal parts by two equally spaced horizontal lines and two equally spaced vertical lines, and that important compositional elements should be placed along these lines or their intersections. As described herein, image adjustment operations can be triggered when the user 110 exits the central region delimited by the third frame lines.

At operations 101-3, 101-4, and 101-5, a portion of the user 110 to be reproduced on the display panel 108 (and, accordingly on the display panels of other users of a teleconference event) can be determined. For example, at operation 101-3, a head portion of the user 110 can be selected for reproduction; at operation 101-4, a head portion and a shoulder portion of the user 110 can be selected for reproduction; at operation 101-5, a head portion, a shoulder portion, and a chest portion can be selected for reproduction. The combinations of portion(s) of the user 110 to be reproduced can be referred to as a "composition" or "selected composition."

In some examples, the portion(s) of the user 110 for reproduction can be selected via a user input (e.g., an input to a graphical user interface of the computing device), among other possible modes of selection. That is, in some examples, the portion(s) of the user 110 to be reproduced in an output image can be selectable by, for instance, the user 110. In the interest of clarity, an example in which the head portion and the shoulder portion of the user 110 are selected for reproduction is described; however, it will be understood that similar techniques can be applied in the event that head portion is selected for reproduction and in the event that the head portion, the shoulder portion, and the chest portion are selected for reproduction.

Once the composition is determined (e.g., once it is determined which portion(s) of the user 110 are to be reproduced), at operations 101-3, 101-4, and 101-5, an area of interest 114 is generated. The area of interest 114 can be based on the composition and on a quantity of pixels located within the bounding box 112. For example, a factor (e.g., a scaling factor) can be generated to determine a height and/or width of the area of interest 114. Because the area of interest 114 can be based on the composition and the size of the bounding box 112, and/or the factor to determine the height and/or the width of the area of interest 114, the output result (described in connection with operations 101-6 and 101-7, below) can be generated by increasing or decreasing the field of view of the imaging device 102.

In an illustrative example, if face is 100×200 pixels (width×height) and the factor is two (2), the area of interest 114 would be 400 pixels in height. Using this information, a resolution of the output image can be determined such that the aspect ratio of the output result is the same (or nearly the same) as the aspect ratio of the input image. In another example, if the input image is 1280×720 pixels with an aspect ratio of 16:9, there are 1280/16=80 available resolutions. In this example, if the area of interest 114 is 400 pixels in height, the next resolution available to keep the aspect ratio would be 720×405 pixels and image adjustment in accordance with the disclosure can be performed to generate an output image having a size of 720×405 pixels.

At operation 101-6, various operations can be executed to generate the final output image. For example, cropping function, pan operations, tilt operation, and/or zoom operations, among others, can be performed as part of image adjustment describe herein to generate the final output image. For example, an input image can be cropped in accordance with the non-limiting example described in connection with operations 101-3, 101-4, and 101-5 to crop extraneous portions of the image to generate the output image.

In other examples, a camera pan operation, which involves moving the camera from side to side along a horizontal plane, a camera tilt operation, which involves moving the camera along a vertical plane, and/or other such operations can be performed to generate the output image. By attempting to bring each side of the original image towards the area of interest 114 using combinations of camera pan, camera tilt, and/or camera zoom operations, the output image can be generated as described herein. In such examples, the camera pan, the camera tilt, and/or the camera zoom operations can be performed via the execution of instructions by the processor resource 104 to generate the effect of such operations, as opposed to performing the camera pan, the camera tilt, and/or the camera zoom operations mechanically (e.g., by causing the imaging device 102 to physically move).

In some examples, once the area of interest 114 has been determined, the camera pan, camera tilt, and/or camera zoom operations can be performed to keep the user 110 within the area of interest 114. However, the processor resource 104 can perform operations to determine an intent of the user 110 if it is detected that the user has moved with respect to the bounding box 112 and/or the area of interest 114. For example, if the camera pan, camera tilt, and/or camera zoom operations are performed immediately in response to movement of the user 110, undesirable effects such as jitter can be introduced to the reproduced output image of the user 110.

In order to mitigate these and other undesirable effects, some examples provide that an area within the area of interest 114 is generated and monitored. In such examples, if the user 110 moves outside of the area within the area of interest 110, image adjustment operations may not be performed. If the user 110 moves out of the area within the area of interest 114, it can be determined how long the user 110 is outside of the area within the area of interest 114, If the user 110 remains outside of the area within the area of interest for less than a threshold period of time, it may be determined that the movement was accidental and the processor resource 104 may refrain from performing image adjustment operations. In contrast, if the user 110 remains outside of the area within the area of interest for greater than a threshold period of time, image adjustment operations can be performed to adjust the area of interest 114 to maintain the user within the area of interest 114.

Figure 2:
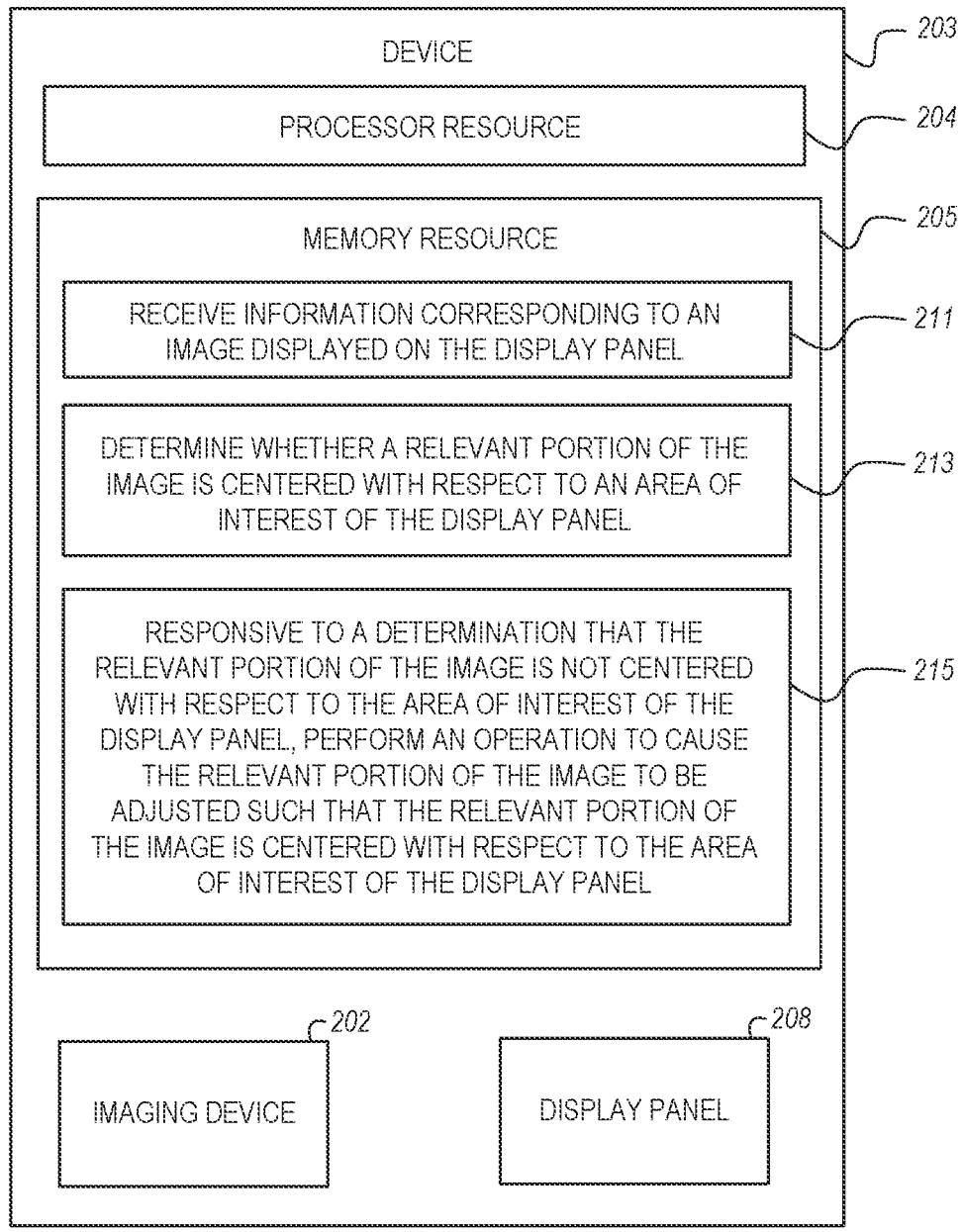
FIG. 2 illustrates an example of a memory resource for providing image adjustment.

FIG. 2 illustrates an example of a device 203 for providing image adjustment. In some examples, the device 203 can include a processor resource 204 communicatively coupled to a memory resource 205. As described further herein, the memory resource 205 can include instructions 211, 213, 215 that can be executed by the processor resource 204 to perform particular functions. In some examples, the device 203 can be utilized to interact with a plurality of remote computing devices and/or remote teleconference devices. In some examples, the device 203 can be coupled to an imaging device 202 (e.g., camera, video camera, etc.), such as the imaging device 102 illustrated in FIG. 1, and/or display panel 208 (e.g., display device, monitor, etc.). In these examples, the device 203 can capture image data utilizing the imaging device 202 and/or display images captured by remote devices utilizing the display panel 208.

The device 203 can be a computing device that can include components such as a processor resource 204 (referred to herein for brevity as a "processor"). As used herein, the processor resource 204 can include, but is not limited to: a central processing unit (CPU), an application specific integrated circuit (ASIC), a field programmable gate array (FPGA), a metal-programmable cell array (MPGA), a semiconductor-based microprocessor, or other combination of circuitry and/or logic to orchestrate execution of instructions 211, 213, 215. In other examples, the device 203 can include instructions 211, 213, 215, stored on a machine-readable medium (e.g., the memory resource 206, the non-transitory computer-readable medium, 407 illustrated in FIG. 4, herein, etc.) and executable by a processor resource 203. In a specific example, the device 203 utilizes a non-transitory computer-readable medium storing instructions 211, 213, 215, that, when executed, cause the processor resource 203 to perform corresponding functions.

As described herein, the device 203 can receive images that are captured by an imaging device 202. For example, the device 203 can receive images from a camera communicatively coupled to the device 203 and/or a remote computing device (e.g., teleconference device, etc.). The images can be video images that are captured in real time to provide a real time view of the user within the video image during the teleconference session. The device 203 can thereby permit monitoring of movements of a human user with respect to the imaginal device 202 and/or the display panel 208 in real time to allow for the image adjustments described herein.

In some examples, the video images captured during a teleconference can include a plurality of frames that are captured by the imaging device 202 and transmitted to the processor resource 204, In some examples, the processor resource 204 can utilize a driver device transform to intercept image data captured by an imaging device associated with a computing device. In some examples, the driver device transform can intercept the image/video data and alter the image/video data (e.g., to cease display/emission of the original "live" image/video data). In other examples, a proxy camera or virtual camera can be utilized to intercept the image data and alter the image data to include the additional elements.

In some examples, the device 203 can include instructions 211 to receive information corresponding to an image displayed on the display panel 208. The information corresponding to the image can be captured by the imaging device 202 in some examples. The received information corresponding to the image can include information indicative of the image containing a human user, such as the human user 110 illustrated in FIG. 1, herein. In some examples, the relevant portion of the image can include a face region, a shoulder region, and/or or a chest region of the human user, as described above in connection with FIG. 1.

The device 203 can include instruction 213 to determine whether a relevant portion of the image is centered with respect to an area of interest of the display panel 208. The area of interest can be analogous to the area of interest 114 illustrated in FIG. 1, herein. The relevant portion of the image can, in some examples, be an image of a human user as opposed to an image of a background area of a location in which the human user is located or a particular human user as opposed to multiple human users if multiple human users are present in the field of the imaging device 202.

The device 203 can include instruction 215 to, responsive to a determination that the relevant portion of the image is not centered with respect to the area of interest of the display panel 208, perform an operation to cause the relevant portion of the image to be adjusted such that the relevant portion of the image is centered with respect to the area of interest of the display panel 208. As described above, the processor 204 can maintain an aspect ratio of the image as part of performance of the operation to cause the relevant portion of the image to be adjusted such that the relevant portion of the image is centered with respect to the area of interest of the display panel 208. Examples are not so limited, however, and the processor 204 can perform the operation to cause the relevant portion of the image to be adjusted such that the relevant portion of the image is centered with respect to the area of interest of the display panel 208 by causing a size of the relevant portion of the image to be increased or decreased.

As described above in connection with FIG. 1, the processor 204 can determine whether the relevant portion of the image is centered with respect to the area of interest of the display panel 208 based on application of a rule of thirds involving the display panel 208.

The processor 204 can determine a center point of the image. The center point of the image can correspond to the white dot illustrated in FIG. 1 and discussed in connection with operation 101-2 above. The processor 204 can, in such examples, determine whether the relevant portion of the image is centered with respect to the area of interest of the display panel 208 based on whether the center point of the image is centered with respect to the area of interest of the display panel 208.

In some examples, the processor 204 can generate a bounding box that contains the image. The bounding box can be analogous to the bounding box 112 illustrated in FIG. 1, herein. The processor 204 can determine whether the bounding box that contains the image is centered with respect to the area of interest of the display panel 208. Based on this determination, the processor 204 can perform operations described herein to provide image adjustment.

Figure 3:
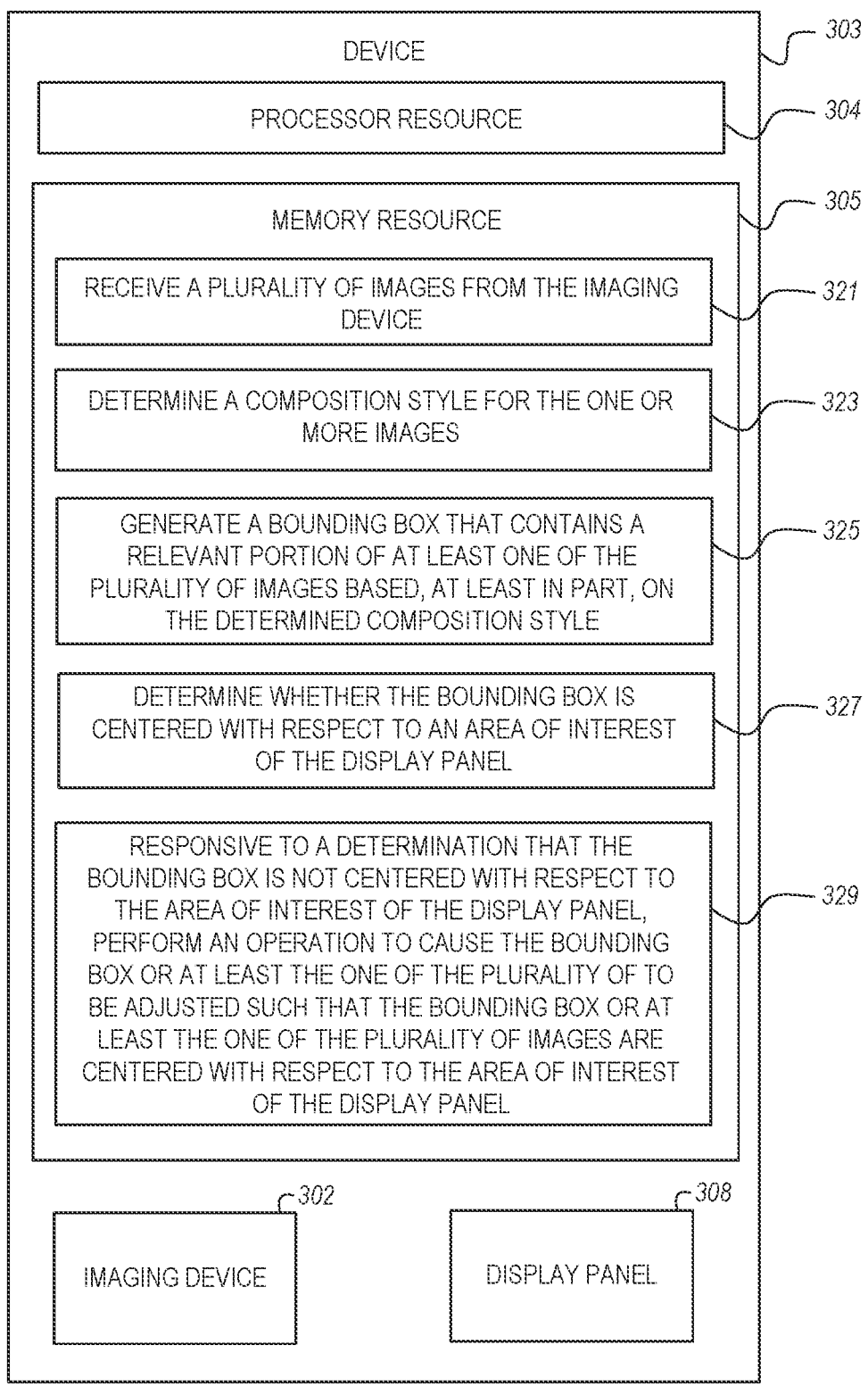
FIG. 3 illustrates an example of a device for providing image adjustment.

FIG. 3 illustrates an example of a device 303 for providing image adjustment. In some examples, the device 303 can include a processor resource 304 communicatively coupled to a memory resource 305. In some examples, the memory resource 305 can be a part of a computing device or controller that can be communicatively coupled to a system. For example, the memory resource 305 can be part of a device 203 as referenced in FIG. 2. In some examples, the memory resource 305 can be communicatively coupled to a processor resource 304 that can execute instructions 321, 323, 325, 327, 329 stored on the memory resource 305. For example, the memory resource 305 can be communicatively coupled to the processor resource 304 through a communication path. In some examples, a communication path can include a wired or wireless connection that can allow communication between devices and/or components within a device or system.

The memory resource 305 may be electronic, magnetic, optical, or other physical storage device that stores executable instructions. Thus, a non-transitory machine-readable medium (MRM) (e.g., a memory resource 305) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 305) may be disposed within a controller and/or computing device. In this example, the executable instructions 321, 323, 325, 327, 329 can be "installed" on the device. In some examples, the non-transitory machine-readable medium (e.g., a memory resource) can be a portable, external or remote storage medium, for example, that allows a computing system to download the instructions 321, 323, 325, 327, 329, from the portable/external/remote storage medium. In this situation, the executable instructions may be part of an "installation package". As described herein, the non-transitory machine-readable medium (e.g., a memory resource 305) can be encoded with executable instructions for performing calculations or computing processes.

For example, as described further herein, the memory resource 305 can include instructions 321, 323, 325, 327, 329 that can be executed by the processor resource 304 to perform particular functions. In some examples, the device 303 can be utilized to interact with a plurality of remote computing devices and/or remote teleconference devices. In some examples, the device 303 can be coupled to an imaging device 302 (e.g., camera, video camera, etc.), such as the imaging device 102 illustrated in FIG. 1, and/or display panel 308 (e.g., display device, monitor, etc.), such as the display panel 108 illustrated in FIG. 1. In these examples, the device 303 can capture image data utilizing the imaging device 302 and/or display images captured by remote devices utilizing the display panel 308.

The instructions 321, when executed by a processor resource such as the processor resource 304, can include instructions to receive a plurality of images from the imaging device 302. The plurality of images can include multiple successive images that are displayed as part of a stream of images during a teleconference event. As described herein, examples are not limited to images that include a single human user, however. For example, at the one image of the plurality of images can include multiple human users, and at least one such user can be selected to be displayed as described above.

The instructions 323, when executed by a processor resource such as the processor resource 304, can include instructions to determine a composition style for the plurality of images. The composition can be a composition that displays a head portion of a user (e.g., the user 100 illustrated in FIG. 1, herein), a head portion and a shoulder portion of the user, and/or a head portion, a shoulder portion, and a chest portion of the user, among other composition types. As described above, in some examples, the composition can be selectable from a list of composition types or styles that can be selected via an input received by the processor 304 from the user via, for example a graphical user interface. As a result, at least the one of the plurality of images can include a face region, a shoulder region, and/or a chest region of at least one human user of the imaging device 302.

The instructions 325, when executed by a processor resource such as the processor resource 304, can include instructions to generate a bounding box (e.g., the bounding box 112 illustrated in FIG. 1, herein) that contains a relevant portion of at least one of the plurality of images based, at least in part, on the determined composition style. As used herein, a "relevant portion" of at least one of the plurality of images includes a portion of the image that contains a user of a computing device in which the processor 304 is deployed.

The instructions 327, when executed by a processor resource such as the processor resource 304, can include instructions to determine whether the bounding box is centered with respect to an area of interest (e.g., the area of interest 114 illustrated in FIG. 1, herein) of the display panel 208. In some examples, the processor 304 is to perform the operation to cause the bounding box or at least the one of the plurality images to be adjusted such that the bounding box or at least the one of the plurality of images are centered with respect to the area of interest of the display panel by causing a size of the bounding box to be increased or decreased or a quantity of pixels associated with at least the one of the plurality images of to be increased or decreased. Further, as described above, the processor 304 is to determine whether the bounding box is centered with respect to the area of interest of the display panel 308 based on application of a rule of thirds involving the display panel 308.

The instructions 329, when executed by a processor resource such as the processor resource 304, can include instructions to responsive to a determination that the bounding box is not centered with respect to the area of interest of the display panel, perform an operation to cause the bounding box or at least the one of the plurality of to be adjusted such that the bounding box or at least the one of the plurality of images are centered with respect to the area of interest of the display panel.

Figure 4:
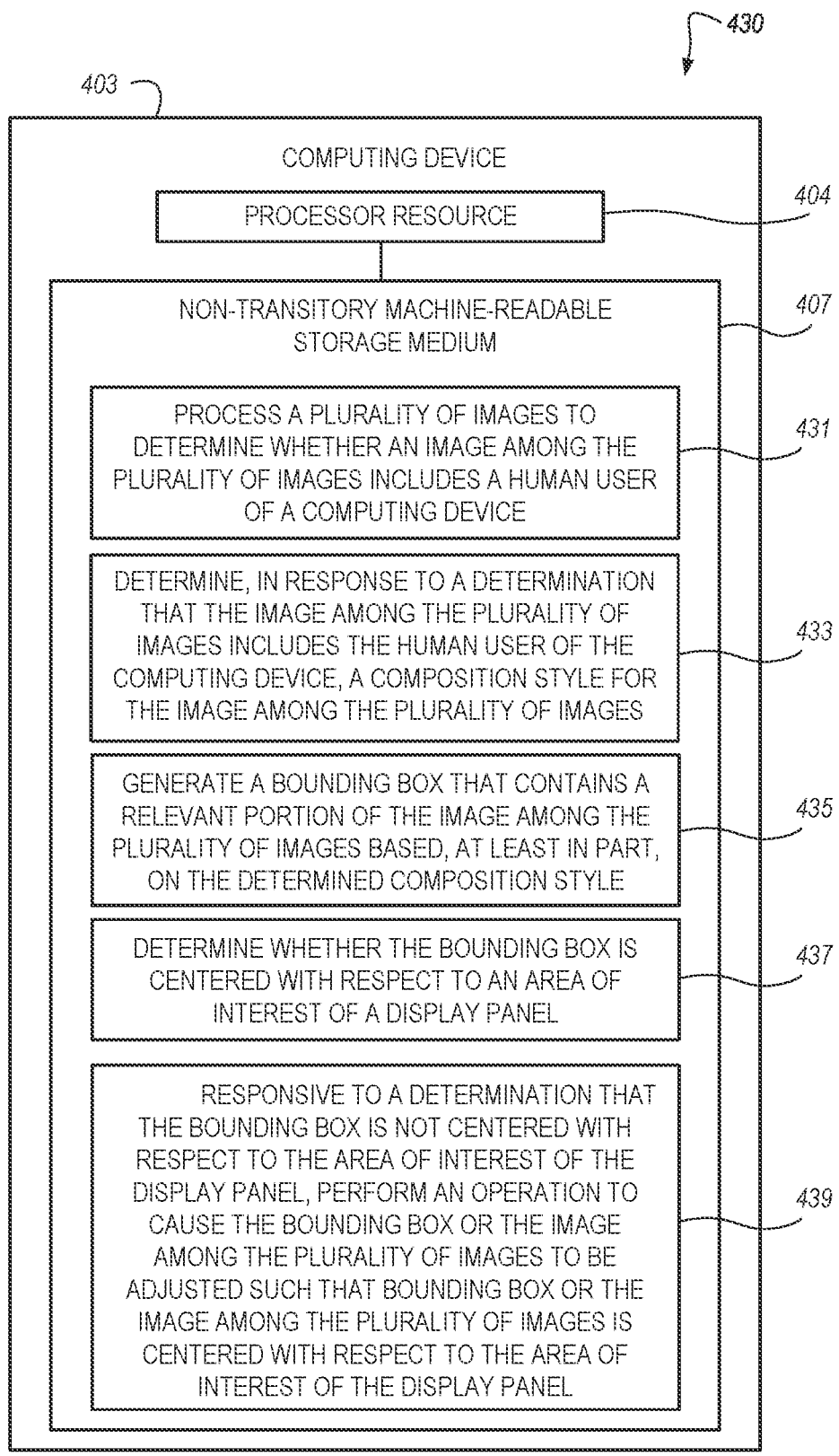
FIG. 4 is a block diagram of an example system for image adjustment.

FIG. 4 is a block diagram of an example system 430 for image adjustment. In the example of FIG. 4, the system 430 includes a computing device 403 including a processor resource 404 and a non-transitory machine-readable storage medium 407. Although the following descriptions refer to a single processor resource and a single machine-readable storage medium, the descriptions may also apply to a system with multiple processor resources and multiple non-transitory machine-readable storage mediums. In such examples, the instructions may be distributed across multiple machine-readable storage mediums and the instructions may be distributed across multiple processor resources. Put another way, the instructions may be stored across multiple machine-readable storage mediums and executed across multiple processor resources, such as in a distributed computing environment.

The processor resource 404 may be a central processing unit (CPU), microprocessor, and/or other hardware device suitable for retrieval and execution of instructions stored in the non-transitory machine-readable storage medium 407. In the particular example shown in FIG. 4, the processor resource 403 may process, determine, generate, determine, and perform instructions 431, 433, 435, 437, and/or 439. As an alternative or in addition to retrieving and executing instructions, processor resource 404 may include an electronic circuit comprising a number of electronic components for performing the operations of the instructions in the non-transitory machine-readable storage medium 407. With respect to the executable instruction representations or boxes described and shown herein, it should be understood that part or all of the executable instructions and/or electronic circuits included within one box may be included in a different box shown in the figures or in a different box not shown.

The non-transitory machine-readable storage medium 407 may be any electronic, magnetic, optical, or other physical storage device that stores executable instructions. Thus, the non-transitory machine-readable storage medium 407 may be, for example, Random Access Memory (RAM), an Electrically-Erasable Programmable Read-Only Memory (EEPROM), a storage drive, an optical disc, and the like. The executable instructions may be "installed" on the system 430 illustrated in FIG. 4. The non-transitory machine-readable storage medium 407 may be a portable, external or remote storage medium, for example, that allows the system 430 to download the instructions from the portable/external/remote storage medium. In this situation, the executable instructions may be part of an "installation package."

The process instructions 431, when executed by a processor resource such as the processor resource 404, may cause the system 430 to process a plurality of images to determine whether an image among the plurality of images includes a human user (e.g., the human user 110 illustrated in FIG. 1, herein) of a computing device. As described above, the plurality of images can be captured by an imaging device, such as the imaging device 102 illustrated in FIG. 1. The processor resource 404 may process the images to perform image adjustment, as detailed herein.

The determine instructions 433, when executed by a processor resource such as the processor resource 404, may cause the system 430 to determine, in response to a determination that the image among the plurality of images includes the human user of the computing device, a composition style for the image among the plurality of images. As describe above, the composition style can include a portion or portions of the human user to be reproduced on a display panel (e.g., the display panel 108 illustrated in FIG. 1, herein) and/or a display panel of a different computing device that is connected to a teleconference event.

The determine instructions 435, when executed by a processor resource such as the processor resource 404, may cause the system 430 to generate a bounding box that contains a relevant portion of the image among the plurality of images based, at least in part, on the determined composition style.

The determine instructions 437, when executed by a processor resource such as the processor resource 404, may cause the system 430 to determine whether the bounding box is centered with respect to an area of interest (e.g., the area of interest 114 illustrated in FIG. 1, herein) of a display panel (e.g., the display panel 108 illustrated in FIG. 1, herein). In some examples, the instructions are executed to further cause the processor resource to determine whether the bounding box is centered with respect to the area of interest of the display panel based on application of a rule of thirds involving the display panel, as described above.

The determine instructions 439, when executed by a processor resource such as the processor resource 404, may cause the system 430 to responsive to a determination that the bounding box is not centered with respect to the area of interest of the display panel, perform an operation to cause the bounding box or the image among the plurality of images to be adjusted such that bounding box or the image among the plurality of images is centered with respect to the area of interest of the display panel. The instructions are executed to further cause the processor resource to perform the operation to cause the bounding box or the image among the plurality of images to be adjusted such that the bounding box or the image among the plurality of images is centered with respect to the area of interest of the display panel by causing a size of the bounding box to be increased or decreased or a quantity of pixels associated with the image among the plurality of images to be increased or decreased.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A device, comprising:
   a display panel; and
   a processor to:
      receive information corresponding to an image displayed on the display panel,
      determine whether a relevant portion of the image is centered with respect to an area of interest of the display panel;
      determine whether a movement of the relevant portion of the image with respect to the area of interest of the display panel is intentional; and
      responsive to a determination that the relevant portion of the image is not centered with respect to the area of interest of the display panel and that the movement of the relevant portion of the image with respect to the area of interest of the display panel is not intentional, perform an operation to cause the relevant portion of the image to be adjusted such that the relevant portion of the image is centered with respect to the area of interest of the display panel.

2. The device of claim 1, wherein:
   the received information corresponding to the image includes information indicative of the image containing a human user, and
   the relevant portion of the image includes a face region, a shoulder region, or a chest region, or a combination thereof, of the human user.

3. The device of claim 1, wherein the processor is to determine whether the relevant portion of the image is centered with respect to the area of interest of the display panel based on application of a rule of thirds involving the display panel.

4. The device of claim 1, wherein the processor to:
   determine a center point of the image; and
   determine whether the relevant portion of the image is centered with respect to the area of interest of the display panel based on whether the center point of the image is centered with respect to the area of interest of the display panel.

5. The device of claim 1, wherein the processor is to maintain an aspect ratio of the image as part of performance of the operation to cause the relevant portion of the image to be adjusted such that the relevant portion of the image is centered with respect to the area of interest of the display panel.

6. The device of claim 1, wherein the processor is to:
   generate a bounding box that contains the image; and
   determine whether the bounding box that contains the image is centered with respect to the area of interest of the display panel.

7. The device of claim 1, wherein the processor is to perform the operation to cause the relevant portion of the image to be adjusted such that the relevant portion of the image is centered with respect to the area of interest of the display panel by causing a size of the relevant portion of the image to be increased or decreased.

8. A device, comprising:
   a display panel;
   an imaging device coupled to the display panel; and
   a processor coupled to the imaging device, wherein the processor is to:
      receive a plurality of images from the imaging device;
      determine a composition style for the plurality of images;
      generate a bounding box that contains a relevant portion of at least one of the plurality of images based, at least in part, on the determined composition style;
      determine whether the bounding box is centered with respect to an area of interest of the display panel;
      determine whether a movement of the bounding box with respect to the area of interest is intentional; and
      responsive to a determination that the bounding box is not centered with respect to the area of interest of the display panel and that the movement of the bounding box with respect to the area of interest is intentional, perform an operation to cause the bounding box or at least the one of the plurality of to be adjusted such that the bounding box or at least the one of the plurality of images are centered with respect to the area of interest of the display panel.

9. The device of claim 8, wherein the processor is to maintain an aspect ratio of at least the one of the plurality of images as part of performance of the operation to cause the bounding box or at least the one of the plurality of to be adjusted such that the bounding box or at least the one of the plurality of images are centered with respect to the area of interest of the display panel.

10. The device of claim 8, wherein the processor is to perform the operation to cause the bounding box or at least the one of the plurality of images to be adjusted such that the bounding box or at least the one of the plurality of images are centered with respect to the area of interest of the display panel by causing a size of the bounding box to be increased or decreased or a quantity of pixels associated with at least the one of the plurality of images to be increased or decreased.

11. The device of claim 8, wherein the processor is to determine whether the bounding box is centered with respect to the area of interest of the display panel based on application of a rule of thirds involving the display panel.

12. The device of claim 8, wherein at least the one of the plurality of images includes a face region, a shoulder region, or a chest region, or any combination thereof, of at least one human user of the imaging device.

13. A non-transitory memory resource storing machine-readable instructions thereon that, when executed, cause a processor resource to:
    process a plurality of images to determine whether an image among the plurality of images includes a human user of a computing device;
    determine, in response to a determination that the image among the plurality of images includes the human user of the computing device, a composition style for the image among the plurality of images;
    generate a bounding box that contains a relevant portion of the image among the plurality of images based, at least in part, on the determined composition style;
    determine whether the bounding box is centered with respect to an area of interest of a display panel;
    determine whether a movement of the relevant portion of the image with respect to the area of interest is intentional; and
    responsive to a determination that the bounding box is not centered with respect to the area of interest of the display panel and that the movement of the bounding box with respect to the area of interest is intentional, perform an operation to cause the bounding box or the image among the plurality of images to be adjusted such that bounding box or the image among the plurality of images is centered with respect to the area of interest of the display panel.

14. The memory resource of claim 13, wherein the instructions are executed to further cause the processor resource to determine whether the bounding box is centered with respect to the area of interest of the display panel based on application of a rule of thirds involving the display panel.

15. The memory resource of claim 13, wherein the instructions are executed to further cause the processor resource to perform the operation to cause the bounding box or the image among the plurality of images to be adjusted such that the bounding box or the image among the plurality of images is centered with respect to the area of interest of the display panel by causing a size of the bounding box to be increased or decreased or a quantity of pixels associated with the image among the plurality of images to be increased or decreased.

16. The device of claim 1, wherein the processor is to determine whether the movement of the relevant portion of the image with respect to the area of interest of the display panel is intentional by:
    determining a period of time that the relevant portion of the image is not centered with respect to the area of interest of the display panel; and
    comparing the period of time to a threshold period of time.

17. The device of claim 1, wherein the processor is to determine whether the relevant portion of the image is centered with respect to the area of interest of the display panel based on a facial detection operation.

18. The device of claim 8, wherein the processor is to determine whether the movement of the bounding box with respect to the area of interest of the display panel is intentional by:
    determining a period of time that an element within the bounding box is not centered with respect to the area of interest of the display panel; and
    comparing the period of time to a threshold period of time.

19. The device of claim 8, wherein the relevant portion of at least one of the plurality of images is a face, and the processor is to determine whether the bounding box is centered with respect to the area of interest of the display panel based on a facial detection operation.

20. The memory of claim 13, wherein the instructions are executed to further cause the processor resource to determine whether movement of the relevant portion of the image with respect to the area of interest of the display panel is intentional based on a length of time during which the relevant portion of the image remains outside of an area within the area of interest.

* * * * *